Dec. 12, 1961   A. CLARKSON   3,012,741
PITCH ATTITUDE STABILIZING SYSTEM FOR AIRCRAFT
Filed Feb. 9, 1959   2 Sheets-Sheet 1

INVENTOR.
ALICK CLARKSON
BY
Knox & Knox

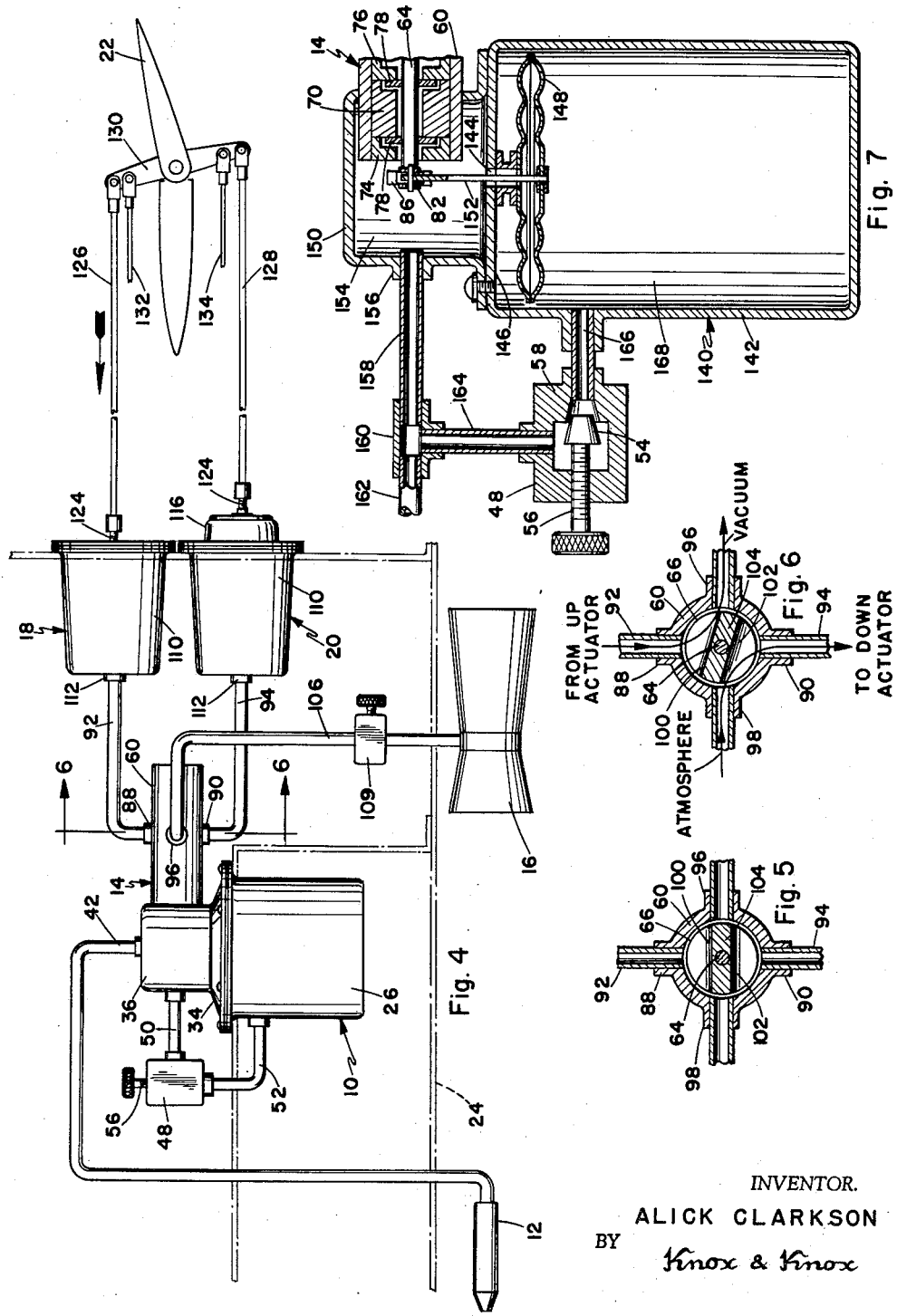

United States Patent Office 3,012,741
Patented Dec. 12, 1961

3,012,741
PITCH ATTITUDE STABILIZING SYSTEM
FOR AIRCRAFT
Alick Clarkson, Paul Spur, Ariz.
Filed Feb. 9, 1959, Ser. No. 791,912
1 Claim. (Cl. 244—78)

The present invention relates generally to aircraft flight controls and more particularly to a pitch attitude stabilizing system for aircraft.

The primary object of this invention is to provide a pitch stabilizing system which will actuate the elevators of an aircraft to maintain the aircraft in level flight at a constant speed within close limits, all power for the mechanism being derived from the aircraft slipstream.

Another object of this invention is to provide a pitch stabilizing system having a pressure sensitive pick-up element to detect speed and pressure changes in the slipstream, which denote pitching motions or airspeed changes of the aircraft.

Another object of this invention is to provide a pitch stabilizing system in which the control actuating power is obtained from a vacuum source such as a venturi.

Still another object of this invention is to provide a pitch stabilizing system which, while maintaining positive and firm control, can be overpowered manually at any time for normal manual control without the need for bypass or cut-off valves, or the like.

A futher object of this invention is to provide a pitch stabilizing system which can easily be installed in many types of aircraft with a minimum of modification and without interfering with the existing controls.

Finally, it is an object to provide a pitch stabilizing system of the aforementioned character which is simple, safe and convenient to install and use and which will give generally efficient and durable service under varying flight conditions.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 4 is a somewhat diagrammatic view of the complete system coupled to the aircraft control surfaces;

FIGURE 5 is a fragmentary, sectional view taken on the line 5—5 of FIGURE 1;

FIGURE 6 is a sectional view similar to FIGURE 5, but showing the valve offset; and FIGURE 7 is a sectional view similar to a portion of FIGURE 1, showing an alternative pressure sensing assembly.

Similar characters of reference indicate similar or identical elements and portions throughout the specification and throughout the views of the drawings.

Figure 1:
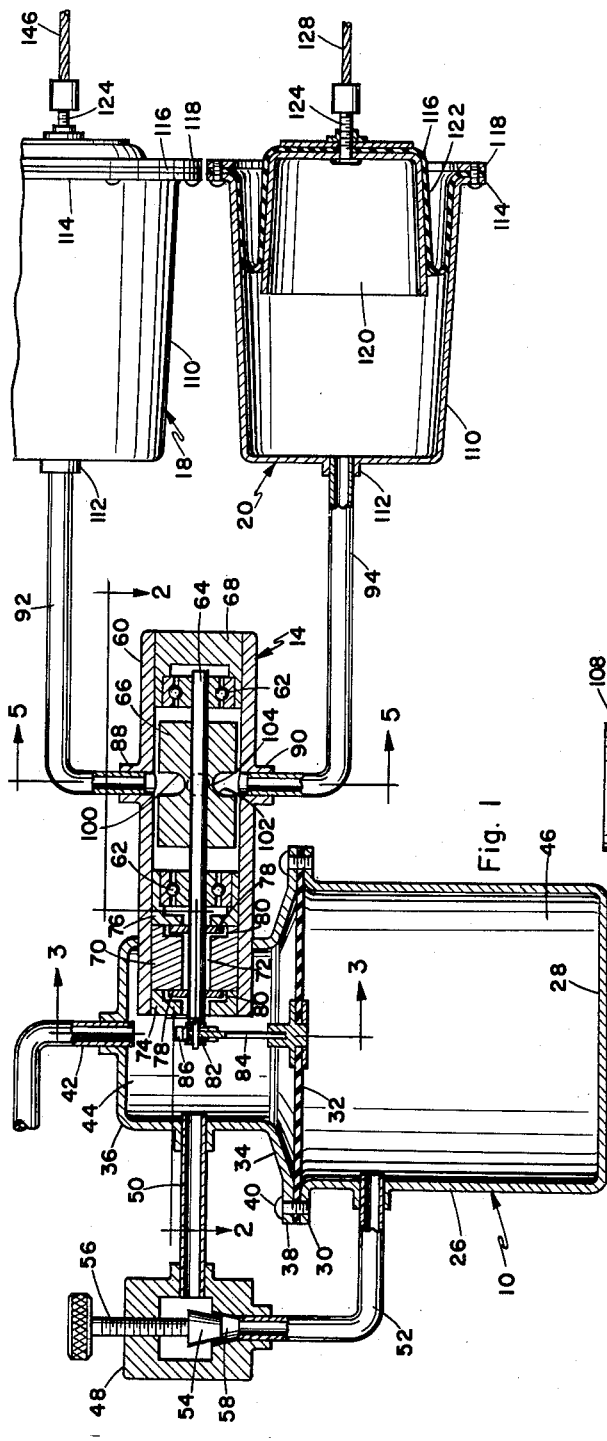
FIGURE 1 is a longitudinal sectional view of the basic apparatus as taken on the line 1—1 of FIGURE 2, portions being shown in full for clarity.
Figure 2:
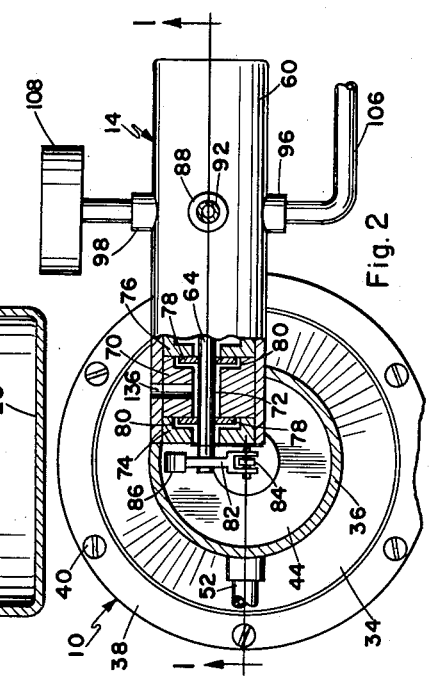
FIGURE 2 is a fragmentary, sectional view taken on the line 2—2 of FIGURE 1.

Referring now to FIGURES 1–6 of the drawings, the system includes a pressure sensing unit 10 connected to a pressure pick-up 12, a valve assembly 14 operatively connected to the sensing unit and provided with vacuum by a venturi 16, said valve assembly being coupled to a pair of actuators 18 and 20 which operate the aircraft's elevators indicated at 22. The apparatus is installed in the aircraft, as in FIGURE 4, with the sensing unit 10 and actuators 18 and 20 mounted on convenient portions of the airframe structure, indicated in broken line, the pick-up 12 and venturi 16 being mounted externally of the aircraft's outer skin 24. The location of the various components will vary according to the particular aircraft.

The pressure sensing unit 10 comprises a cylindrical container 26 having a closed end 28 and an outwardly extending flange 30 at the other, open end. Fitted across the open end of the container 26 is a flexible diaphragm 32 which is held in place by a cap 34 having a cylindrical dome 36 and a flange 38, said flange being secured to the flange 30 by suitable screws 40 to form an airtight seal. Fixed in the top of the dome 36 is an inlet pipe 42 leading to the pressure pick-up 12 to bring pressurized air to the upper side of the diaphragm 32, the inside of said dome comprising a pressure chamber 44 and the container 26 acting as a substantially closed static chamber 46. However, a controlled leak from the pressure chamber 44 to the static chamber 46 is necessary so that the control is rate sensitive, and this is controlled by a bleed valve 48 connected to the two chambers by short connecting pipes 50 and 52. The bleed valve 48 contains a tapered valve element 54 adjusted by a manually operated screw 56 and fitting into a correspondingly tapered seat 58.

The valve assembly 14 is secured to the projects into the dome 36 and comprises a cylindrical barrel 60 having a pair of longitudinally spaced bearings 62 in which is mounted a freely rotatable shaft 64, said shaft having a valve element 66 fixed thereto between said bearings. The outer end of the barrel 60 is sealed by a cap plug 68, while the inner end contains a plug 70 having a central bore 72 substantially larger than the shaft 64. Fixed to the plug 70 are end portions 74 and 76 and secured on the shaft 64 are two sealing discs 78 which fit closely yet freely movably into circular sockets 80 cut in said plug and end portions. Secured to the inner end of the shaft 64 is an arm 82 which is pivotally connected to a stem 84 fixed to and extending upwardly from the diaphragm 32, said arm having a counterweight 86 so that the diaphragm is held normally flat, as in FIGURE 1, and is unaffected by the weight of the stem, thereby eliminating inertial effects. The barrel 60 has a pair of diametrically opposed outlets 88 and 90, to which are connected hoses 92 and 94 leading to the actuators 18 and 20, respectively. Also in the barrel 60 are a vacuum connection 96 and an atmosphere inlet 98, diametrically opposed on an axis normal to and coplanar with the axis of outlets 88 and 90. The valve element 66 has a pair of opposed transverse channels 100 and 102 which are coplanar with outlets 88 and 90, the center portion 104 of said valve element between the channels being of sufficient thickness to block the vacuum connection 96 and inlet 98. The vacuum connection 96 is coupled to the venturi 16 by a supply hose 106 and the atmosphere inlet 98 is connected to a suitable filter 108 to exclude dust and other foreign matter. Sensitivity of the system is controlled by a conventional type sensitivity valve 109 inserted in the supply hose 106 and conveniently located in the aircraft for adjustment. The valve element 66 has a small annular clearance from the barrel 60 so that a constant slight vacuum is applied to the outlets 88 and 90 by leakage around the valve element.

The actuators 18 and 20 are identical and one only need be described, the actuator 18 comprising a slightly tapered, cylindrical can 110 having an inlet 112 at one end and a flange 114 at the other, open end. Attached to the flange 114 is a large flexible diaphragm 116, secured by a clamp ring 118, and fixed to the center of said diaphragm is a cup-like piston 120 which fits inside the can 110, said diaphragm having sufficient slack to extend into the can in a return folded portion 122. Secured to the center of the piston 120 is a pin 124 to which is attached an actuating cable 126, a further actuating cable 128 being attached in a similar manner to the actuator 20. The actuating cables 126 and 128 are connected to the ends of the elevator horn 130 which operates the elevators 22, the connections being made adjacent the existing control cables 132 and 134. Alternatively the cables 126 and 128 may be coupled directly to the control cables 132 and 134 at a convenient point to avoid duplication of cables for their full length. The hoses 92 and 94 are connected to the inlets 112 of actuators 18 and 20, respectively.

In operation, the vacuum generated by the venturi 16 leaks around the valve element 66 and through hoses 92 and 94 to apply a slight vacuum to the actuators 18 and 20, so drawing in both pistons 120 and maintaining tension in the actuating cables 126 and 128. This vacuum leak prevents any slackness in the control system yet does not exert sufficient force to interfere with manual operation of the controls. In normal level flight the pressure at the pick-up point 12 is constant and the diaphragm 32 is undisturbed. Any gradual change in pressure due to atmospheric conditions do not have an immediate effect on the diaphragm 32 and the air is allowed to leak through the bleed valve 48 to the static chamber 46, thus balancing the pressure on both sides of the diaphragm.

Figure 3:
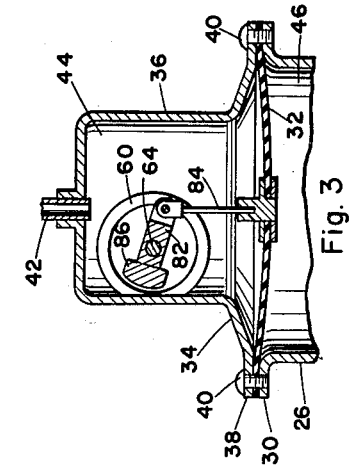
FIGURE 3 is a fragmentary, sectional view taken on the line 3—3 of FIGURE 1.

When the aircraft dives or pitches down, the airspeed naturally increases and consequently the air pressure at the pick-up 12 increases, the excess pressure causing the diaphragm 32 to be depressed, as in FIGURE 3, which pulls the arm 82 downwardly and rotates the valve element 66 to the position indicated in FIGURE 6. In this position the vacuum at the connection 96 is applied through the channel 100 and hose 92 to the actuator 18, drawing in the piston and pulling the elevator 22 up to raise the nose of the aircraft. At the same time, the actuator 20 is opened to atmosphere through the channel 102 of valve element 66, allowing the actuating cable 128 to relax with the elevator movement. When the aircraft is returned to level flight and airspeed is reduced to normal, the pressure on the diaphragm 32 drops and the diaphragm relaxes, returning the valve element 66 to neutral so that the slight vacuum leak once more neutralizes both actuators 18 and 20. When the aircraft climbs or pitches up, the reduced pressure caused by a drop in airspeed allows the diaphragm 32 to bulge upwardly, reversing the valve action and applying down elevator to level the aircraft. It should be noted that the pressure changes due to changes in altitude also contribute to the airspeed variations as the aircraft climbs or dives, and add to the effectiveness of the system. At all times, the leakage through the bleed valve 48 allows the pressure differential on both sides of the diaphragm 32 to equalize, so acting as a buffer and preventing hunting or oscillation in the control action. By adjusting the screw 56, the rate of bleed can be controlled to minimize hunting without loss of effective control.

In the valve assembly 14, leaking of pressure from the chamber 44 to the vacuum source is prevented by the sealing discs 78, which are seated in their sockets 80 by pressure on one side and vacuum on the other, while allowing complete freedom of movement of the shaft 64. As an additional safeguard, the bore 72 between the sealing discs 78 is provided with a small vent 136 to atmosphere, as in FIGURE 2.

An alternative form of the pressure sensing unit is illustrated in FIGURE 7. This unit 140 comprises a cylindrical closed can 142 having a central opening 144 in one end 146. Mounted inside the cam 142 is an aneroid capsule 148 sealed to the end 146 and having its interior communicating with the opening 144. Fixed to the end 146 is a dome-shaped cap 150 in which is mounted a complete valve assembly 14, as previously described, the arm 82 of said valve assembly being connected to the aneroid capsule 148 by a stem 152 extending through the opening 144. The interior of the cap 150 and the aneroid capsule 148 together constitute a pressure chamber 154, said cap having an inlet 156 coupled by a pipe 158, through a T connection 160, to a pressure pick-up pipe 162, which may be connected to a pilot head 12. Extending from the T connection 160 is a short connecting pipe 164 leading to a bleed valve 48, previously described, said bleed valve being coupled to an inlet 166 in the can 142 which comprises a static chamber 168. Thus the pressure chamber 154 and static chamber 168 are interconnected through bleed valve 48 to dampen oscillations in controls. This particular pressure sensing unit 140 operates in the same manner as the unit 10, pressure variations causing actuation of the valve assembly to level the aircraft, and illustrates that either a diaphragm or aneroid element may be used, according to requirements, without any other alteration in the system.

It has been found in flight tests that the system will maintain an aircraft level flight within close limits and maintain airspeed to a preset figure within about three miles an hour. The system is entirely independent of other aircraft services and requires only the pick-up 12 and venturi 16 for actuating power, although the aircraft vacuum pump may be substituted for the venturi if desired.

It is understood that minor variation from the form of the invention disclosed herein may be made without departure from the spirit and scope of the invention, and that the specification and drawings are to be considered as merely illustrative rather than limiting.

I claim:

In a pitch attitude stabilizing system for aircraft: a pressure sensing unit having a pressure chamber and a static chamber; a flexible diaphragm separating said chambers; a bleed valve interconnecting said pressure chamber and said static chamber; said bleed valve being adjustable to contol the rate of pressure leak between the chambers; a pressure pick-up exposed to the airstream and communicating with said pressure chamber; a source of vacuum; a valve mounted on said sensing unit and having an inlet connected to said vacuum source; said valve having a generally cylindrical body; a valve element rotatably mounted in said body; said valve having a pair of outlets; a pair of vacuum operated actuators operatively connected to the pitch attitude control surfaces of the aircraft and communicating with said outlets; said valve element having channels therein aligned with said outlets and said inlet; said valve element being connected to said diaphragm, whereby changes in pressure in said pressure chamber cause rotation of said valve element to connect one or the other of said actuators to said vacuum source.

References Cited in the file of this patent

UNITED STATES PATENTS

| 1,890,041 | McLeod | Dec. 6, 1932 |
| 2,014,965 | Fischel | Sept. 17, 1935 |
| 2,176,807 | Wunsch | Oct. 17, 1939 |
| 2,899,152 | Weiland | Aug. 11, 1959 |

FOREIGN PATENTS

| 360,320 | Italy | June 17, 1938 |
| 737,177 | Germany | May 27, 1943 |